No. 624,621. Patented May 9, 1899.
J. L. BROWN.
CALCULATING DEVICE.
(Application filed Mar. 7, 1899.)
(No Model.)
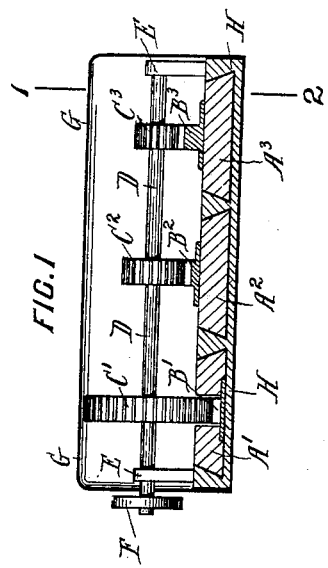
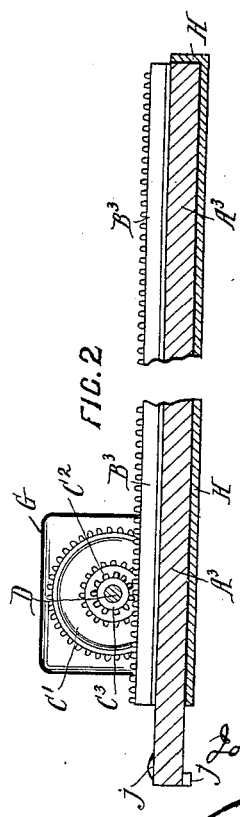
Witnesses:
E. B. Bolton
O. D. Munn
Inventor:
John Laurence Brown
By Richards
his Attorneys.

UNITED STATES PATENT OFFICE.

JOHN L. BROWN, OF BOWENFELS, NEW SOUTH WALES.

CALCULATING DEVICE.

SPECIFICATION forming part of Letters Patent No. 624,621, dated May 9, 1899.

Application filed March 7, 1899. Serial No. 708,153. (No model.)

*To all whom it may concern:*

Be it known that I, JOHN LAURENCE BROWN, a subject of the Queen of Great Britain and Ireland, and a resident of Bowenfels, in the county of Cook and Colony of New South Wales, have invented a certain new and useful Calculating Device, of which the following is a specification.

In making measurements that comprise the fractions of integers it requires a considerable mental effort on the part of uneducated men to find, say, the halves or thirds or doubles or trebles of these fractional parts. This implement has been specially devised for the express purpose of making the calculations automatically.

The invention is an adaptation of the principle shown in the implement known as the "slide-rule;" and it consists of three or more slides which work together, the slides being connected to one another by gearing. On the faces of the slides are line-markings proportionate to one another, thus: No. 1 slide will be marked to normal inches, No. 2 slide will be marked to a scale of two to one, and No. 3 slide will be marked to a scale of three to one, or, if desired, all the slides may be marked alike. Each slide will be provided with a rack, above which, at one end of the slide, is a pinion, the number of teeth in the three pinions being proportional. Thus the pinion gearing with No. 1 slide will have a certain number of teeth, the pinion gearing with No. 2 slide will have half that number of teeth, and the pinion gearing with No. 3 slide will have one-third the number of teeth that there are on the pinion No. 1. The three pinions are keyed onto the same axis, so that when No. 1 slide is pulled out No. 2 and No. 3 slides will be forced out by their respective pinions, No. 2 slide to a distance one-half that of No. 1 and No. 3 to a distance one-third that of No. 1.

In order that the invention may be properly understood, reference is made to the accompanying sheet of drawings, in which—

Figure 1 is a cross-section of the implement, the pinions being shown in elevation. Fig. 2 is a longitudinal section taken on the line 1 2 of Fig. 1.

$A'$ is No. 1 slide, $A^2$ is No. 2 slide, and $A^3$ is No. 3 slide. Racks $B'$ $B^2$ $B^3$ are arranged longitudinally upon the slides, and immediately above the racks are the pinions $C'$ $C^2$ $C^3$, the pinions being all keyed upon the common shaft D, which runs in bearings E E at each end. The shaft D may be provided with a thumb-screw F, by which it may be rotated. The pinions and shaft are preferably inclosed in a box G, so that they will be less liable to be in the way. The box G will be attached to the frame H, in which the slides are mounted.

The slides $A'$ $A^2$ $A^3$ should project slightly beyond one end of the frame H and be provided with projections $j$ to afford a finger-hold on the slides, whereby either one of them may be pulled out by hand. The box containing the pinions is preferably near the extremity of the implement from whence the ends of the slides project. By placing the pinions in this position the slides will be less liable to jam in their grooves and the operation of pulling out the slides will be facilitated.

The implement is worked in the following manner: A measurement is taken by pulling out slide $A'$ to a distance of, say, seven and three-fourths inches. At the same time this will have the effect of projecting $A^2$ slide three and seven-eighths inches and $A^3$ slide two and seven-twelfths inches.

The line-markings upon the slides which give the measurements may be either upon the tops of the slides or on the bevels, and different markings may be given on either bevel or on each side of the slide. The markings may also be made so as to suit the requirements for which the rule is intended.

Having now described my invention, what I claim as new, and desire to secure by Letters Patent, is—

A measuring and calculating implement comprising a series of slides, means for guiding said slides to allow them to move longitudinally, a series of pinions of different sizes, racks carried by the slides and engaged by the pinions and means connecting the several pinions for moving them in unison, substantially as described.

In witness whereof I have hereunto set my hand in presence of two witnesses.

JOHN L. BROWN.

Witnesses:
   JAS. T. HUNTER,
   R. W. EWERS.